United States Patent
Suzuki et al.

(10) Patent No.: US 11,137,542 B2
(45) Date of Patent: Oct. 5, 2021

(54) OPTICAL FIBER

(71) Applicant: SUMITOMO ELECTRIC INDUSTRIES, LTD., Osaka (JP)

(72) Inventors: Masato Suzuki, Osaka (JP); Takemi Hasegawa, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/118,878

(22) Filed: Dec. 11, 2020

(65) Prior Publication Data

US 2021/0199886 A1 Jul. 1, 2021

(30) Foreign Application Priority Data

Dec. 27, 2019 (JP) .............................. JP2019-239383

(51) Int. Cl.
*G02B 6/10* (2006.01)
*G02B 6/02* (2006.01)
*G02B 6/028* (2006.01)

(52) U.S. Cl.
CPC ..... *G02B 6/02395* (2013.01); *G02B 6/02014* (2013.01); *G02B 6/0281* (2013.01)

(58) Field of Classification Search
CPC ......................... G02B 6/0281; G02B 6/02014
See application file for complete search history.

(56) References Cited

U.S. PATENT DOCUMENTS

| | | | |
|---|---|---|---|
| 2013/0188917 A1* | 7/2013 | Hirano | G02B 6/03644 |
| | | | 385/127 |
| 2017/0108642 A1* | 4/2017 | Tamura | C03C 13/045 |
| 2018/0031762 A1* | 2/2018 | Bookbinder | G02B 6/03666 |
| 2019/0391323 A1* | 12/2019 | Miyabe | C03B 37/01446 |

FOREIGN PATENT DOCUMENTS

JP 2017-526601 A 9/2017
WO WO-2016/007806 A1 1/2016

* cited by examiner

*Primary Examiner* — Ellen E Kim
(74) *Attorney, Agent, or Firm* — Faegre Drinker Biddle & Reath LLP

(57) ABSTRACT

An optical fiber includes a core and a cladding. The core contains silica glass and includes a central portion (part having a diameter of 0.5 μm or more and 4 μm or less). The central portion has the central axis of the optical fiber. The cladding contains silica glass and surrounds the core. The core contains chlorine. A chlorine concentration averaged in the entire core is 10,000 ppm or more and 50,000 ppm or less. The chlorine concentration averaged in the entire core minus a chlorine concentration averaged in the central portion is 4,500 ppm or more and 13,500 ppm or less.

16 Claims, 3 Drawing Sheets

OPTICAL FIBER

CROSS-REFERENCE

The present application is based upon and claims the benefit of the priority from Japanese patent application No. P2019-239383, filed on Dec. 27, 2019, which is hereby incorporated by reference in its entirety.

TECHNICAL FIELD

The present disclosure relates to an optical fiber.

BACKGROUND

In an optical fiber that has a core which contains chlorine having a mass fraction of 1.0% or more, a low transmission loss is likely to be obtained, even at a high drawing rate, as compared with an optical fiber in which the core is made of additive-free silica glass and fluorine is added to the cladding. In an optical fiber in which the core is made of additive-free silica glass and fluorine is added to the cladding, the stress in the core region that is applied during drawing is tensile stress. Accordingly, the glass is unlikely to be structurally relaxed. As a result, the drawing rate has to be reduced by reducing the drawing tension in order to reduce the transmission loss. On the other hand, in the optical fiber in which chlorine is added to the core in a mass fraction of 1.0% or more, the stress in the core region that is applied during drawing is compressive stress. Accordingly, a sufficient margin for increasing the drawing rate by increasing the drawing tension can be ensured.

Japanese Unexamined Patent Publication No. 2017-526601 discloses a single light mode optical fiber that has a core which contains chlorine having a mass fraction of 1.5% or more.

SUMMARY

The optical fiber according to one embodiment of the present disclosure includes a core and a cladding. The core contains silica glass and includes a central portion (part having a diameter of 0.5 µm or more and 4 µm or less). The central portion includes the central axis of the optical fiber. The cladding contains silica glass and surrounds the core. The core contains chlorine. A chlorine concentration averaged in the entire core is 10,000 ppm or more and 50,000 ppm or less. The chlorine concentration averaged in the entire core minus a chlorine concentration averaged in the central portion is 4,500 ppm or more and 13,500 ppm or less.

The optical fiber according to another embodiment of the present disclosure includes a core and a cladding. The core includes a central portion (part having a diameter of 0.5 µm or more and 4 µm or less). The central portion includes the central axis of the optical fiber. The cladding surrounds the core. The core contains chlorine. A chlorine concentration averaged in the entire core is 10,000 ppm or more and 50,000 ppm or less. An average relative refractive index difference of the core with respect to an average refractive index of the cladding at a wavelength of 1,550 nm is 0.25% or more and 0.40% or less. A diameter of the core is 8.5 µm or more and 13.5 µm or less. $\Delta n_{plus} - \Delta dip$ is 0.05% or more and 0.15% or less when the relative refractive index difference of the average refractive index of the core with respect to a refractive index of pure silica at a wavelength of 1,550 nm is $\Delta n_{plus}$ and the minimum relative refractive index difference of the central portion with respect to the refractive index of pure silica at a wavelength of 1,550 nm is $\Delta dip$.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
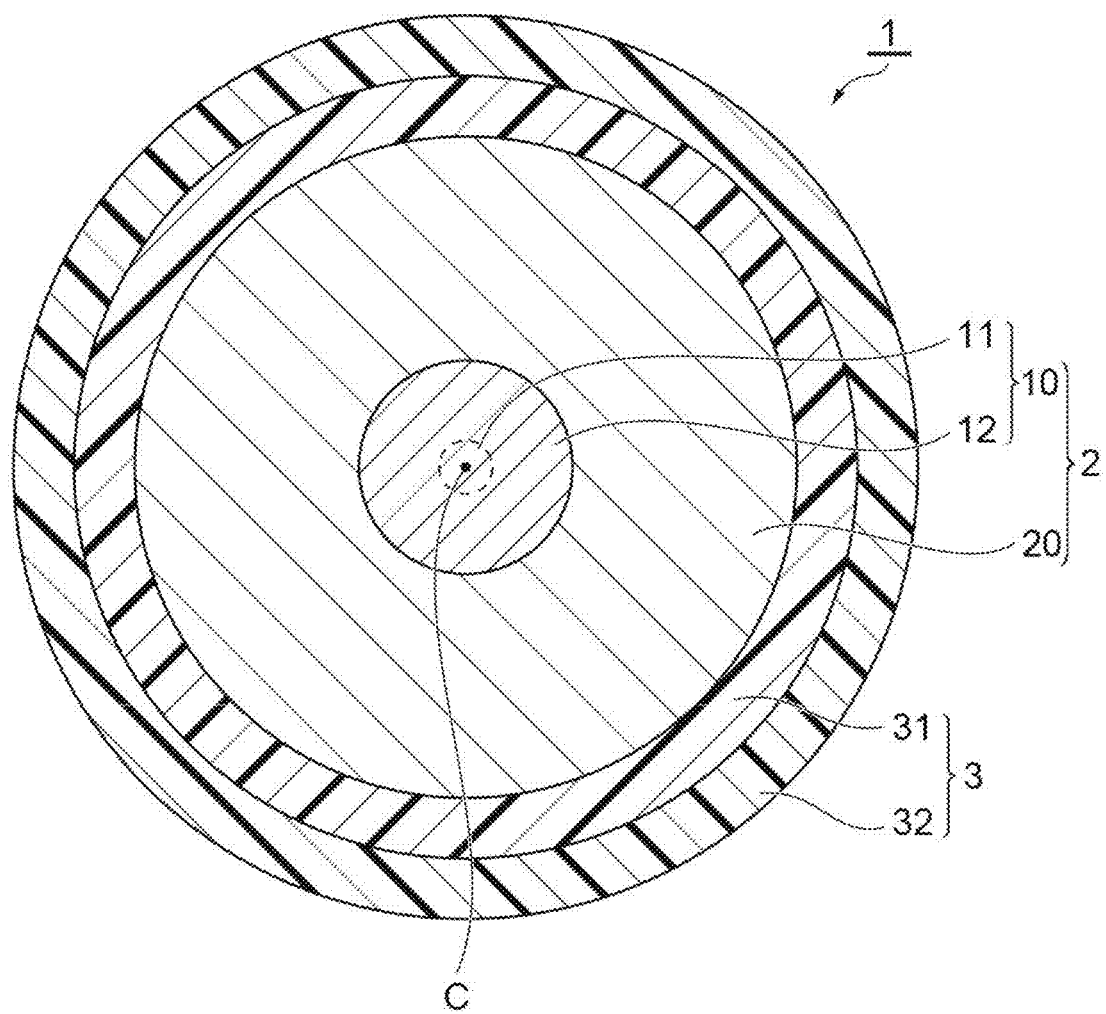
FIG. 1 is a cross-sectional view of the optical fiber according to an embodiment.

Problem to be Solved by the Present Disclosure

A core glass rod containing chlorine having a mass fraction of 1.0% or more is formed by, for example, a glass pipe body that contains chlorine which has a mass fraction of 1.0% or more being formed by the outside vapor deposition (OVD) method, the modified chemical vapor deposition (MCVD) method, or the plasma chemical vapor deposition (PCVD) method and then the opening portion of the glass pipe body being closed by the collapse method. However, bubbles are likely to remain in the central portion of the core glass rod formed by this method.

The bubbles remain in the central portion of the core portion of a preform even after the core glass rod is turned into the preform. Further, the bubbles remain in the central portion of the core of an optical fiber even after the preform (base material) is turned into the fiber through a drawing process. As a result, the transmission loss is exacerbated or a decline in mechanical reliability arises. Accordingly, the part where the bubbles remain is removed as a defective portion. In other words, even if the drawing rate is increased and the productivity in the drawing process is improved by chlorine addition to the core, the problem still remains that overall productivity improvement is impossible due to many defective portions of the optical fiber and a low yield.

In this regard, an object of the present disclosure is to provide an optical fiber capable of suppressing a decline in yield and productivity.

Advantageous Effect of the Present Disclosure

According to the present disclosure, it is possible to provide an optical fiber capable of suppressing a decline in yield and productivity.

Description of Embodiments of the Present Disclosure

First, embodiment of the present disclosure will be listed and described. The optical fiber according to one embodiment includes a core and a cladding. The core contains silica glass and includes a central portion (part having a diameter of 0.5 µm or more and 4 µm or less). The central portion includes the central axis of the optical fiber. The cladding contains silica glass and surrounds the core. The core contains chlorine. A chlorine concentration averaged in the entire core is 10,000 ppm or more and 50,000 ppm or less. The chlorine concentration averaged in the entire core minus a chlorine concentration averaged in the central portion is 4,500 ppm or more and 13,500 ppm or less. Here, the chlorine concentration is expressed as a mass fraction (ratio of the mass of the chlorine contained in the object to the total mass of the object).

In the optical fiber according to the above embodiment, the chlorine concentration on the inner surface of the glass pipe can be suppressed to a low level when the core glass rod is formed by core glass pipe solidification. Accordingly, bubble generation on the inner surface attributable to chlorine can be suppressed. Accordingly, bubbles in the central portion of the core of the optical fiber can be suppressed. As a result, a decline in the yield and productivity of the optical fiber can be suppressed.

An average relative refractive index difference of the core with respect to an average refractive index of the cladding at a wavelength of 1,550 nm may be 0.25% or more and 0.40% or less, and a diameter of the core may be 8.5 µm or more and 13.5 µm or less. Accordingly, it is possible to suppress microbending. As a result, it is possible to suppress an excessive loss and an increase in the connection loss due to microbending. In order to realize the relative refractive index difference described above, it is desirable that the core does not contain germanium and does not contain fluorine, or in the case where the core contains fluorine, the fluorine concentration is suppressed to be lower than the chlorine concentration. In addition, it is preferable that the cladding is formed of pure silica glass or fluorine-added silica glass.

$\Delta n_{plus} - \Delta dip$ may be 0.05% or more and 0.15% or less when the relative refractive index difference of the average refractive index of the core with respect to a refractive index of pure silica at a wavelength of 1,550 nm is $\Delta n_{plus}$ and the minimum relative refractive index difference of the central portion with respect to the refractive index of pure silica at a wavelength of 1,550 nm is $\Delta dip$. In this case, the chlorine concentration averaged in the entire core minus the chlorine concentration averaged in the central portion is likely to be 4,500 ppm or more and 13,500 ppm or less.

The optical fiber according to another embodiment includes a core and a cladding. The core includes a central portion (part having a diameter of 0.5 µm or more and 4 µm or less). The central portion includes the central axis of the optical fiber. The cladding surrounds the core. The core contains chlorine. A chlorine concentration averaged in the entire core is 10,000 ppm or more and 50,000 ppm or less. An average relative refractive index difference of the core with respect to an average refractive index of the cladding at a wavelength of 1,550 nm is 0.25% or more and 0.40% or less. A diameter of the core is 8.5 µm or more and 13.5 µm or less. $\Delta n_{plus} - \Delta dip$ is 0.05% or more and 0.15% or less when the relative refractive index difference of the average refractive index of the core with respect to a refractive index of pure silica at a wavelength of 1,550 nm is $\Delta n_{plus}$ and the minimum relative refractive index difference of the central portion with respect to the refractive index of pure silica at a wavelength of 1,550 nm is $\Delta dip$.

In the optical fiber according to the above embodiment, the chlorine concentration average in the entire core minus the chlorine concentration average in the central portion is likely to be 4,500 ppm or more and 13,500 ppm or less. Accordingly, chlorine bubble generation on the inner surface of the glass pipe is easily suppressed during core glass rod formation. Accordingly, bubbles in the central portion of the core of the optical fiber can be suppressed. As a result, a decline in the yield and productivity of the optical fiber is easily suppressed.

The cladding may contain fluorine. In this case, the relative refractive index difference of the average refractive index of the core with respect to the average refractive index of the cladding at a wavelength of 1,550 nm can be 0.25% or more even when the chlorine concentration of the core is low. Accordingly, the light in the fundamental mode can be trapped.

A mode field diameter of the optical fiber at a wavelength of 1,310 nm may be 8.6 µm or more and 13.0 µm or less. An effective cross-sectional area of the optical fiber at a wavelength of 1,550 nm may be 70 µm² or more and 130 µm² or less. A cable cutoff wavelength of the optical fiber may be 1,530 nm or less. In this case, the optical signal-to-noise ratio of the optical communication system can be improved. In addition, interconnection is possible with widely used optical fibers that comply with the ITU-T G.654 recommendation.

A mode field diameter of the optical fiber at a wavelength of 1,310 nm may be 8.6 µm or more and 11.0 µm or less. An effective cross-sectional area of the optical fiber at a wavelength of 1,550 nm may be 70 µm² or more and 115 µm² or less. A cable cutoff wavelength of the optical fiber may be 1,260 nm or less. In this case as well, the optical signal-to-noise ratio of the optical communication system can be improved. In addition, interconnection is possible with widely used optical fibers that comply with the ITU-T G.652 recommendation.

A transmission loss of the optical fiber at a wavelength of 1,550 nm may be 0.15 dB/km or more and 0.18 dB/km or less. The transmission loss of the optical fiber at a wavelength of 1,310 nm may be 0.24 dB/km or more and 0.40 dB/km or less.

The optical fiber may further include a coating resin layer surrounding the cladding and containing an acrylate-based resin, and a diameter of the coating resin layer may be 190 µm or more and less than 255 µm. In this case, the microbending loss can be suppressed.

The optical fiber may further include a coating resin layer surrounding the cladding and containing an acrylate-based resin, and a diameter of the coating resin layer may be 190 µm or more and less than 210 µm. In this case as well, the microbending loss can be suppressed.

Detailed Description of the Embodiments of the Present Disclosure

Specific examples of the optical fiber of the present disclosure will be described below with reference to the drawings. It should be noted that the present invention is not limited to the exemplifications, is indicated by the scope of claims, and is intended to include every modification within the meaning and scope equivalent to the scope of claims. In the description of the drawings, the same elements are denoted by the same reference numerals without redundant description.

According to the findings of the present inventors, chlorine bubbles (meaning bubbles containing chlorine and its compounds) are generated on the inner surface of a glass pipe body when the glass pipe body to which chlorine is added in a mass fraction of 1.0% (10,000 ppm) or more is collapsed and solidified. This phenomenon occurs in a case where the chlorine concentration on the inner surface of the glass pipe body is high. In other words, when the glass pipe body to which chlorine is added at a high concentration up to the inner surface is heated, chlorine bubbles are generated on the inner surface and the generated chlorine bubbles remain in the central portion of a core glass rod after collapse. In this regard, the chlorine bubbles are suppressed by reducing the chlorine concentration on the inner surface of the glass pipe body.

Methods for reducing the chlorine concentration on the inner surface of the glass pipe body will be described. In the MCVD method and the PCVD method, the concentration of the chlorine raw material gas that flows when glass is deposited is adjusted. By lowering the concentration of chlorine gas at the time of depositing the region to become the central portion after collapse, it is possible to reduce the chlorine concentration on the inner surface of the glass pipe body.

In the OVD method, it is possible to reduce the chlorine concentration on the inner surface of the glass pipe body by adding chlorine to a soot pipe, baking it sufficiently, and then collapsing it. In addition, when soot is deposited on the starting rod in the OVD method, the soot may be deposited such that the bulk density of the part near the inner surface of the pipe increases.

FIG. 1 is a cross-sectional view of the optical fiber according to an embodiment. As illustrated in FIG. 1, an optical fiber 1 of the present embodiment includes a glass fiber 2 and a coating resin layer 3 surrounding the glass fiber 2. The glass fiber 2 includes a core 10 and cladding 20 surrounding the core 10. The cross-sectional view of FIG. 1 illustrates a cross section perpendicular to the central axis C of the optical fiber 1.

The core 10 has a central portion 11 including the central axis C and an outer core portion 12 surrounding the central portion 11. A diameter (outer diameter) 2a of the core 10 is, for example, 8.5 µm or more and 13.5 µm or less. The diameter 2a may be, for example, 8.5 µm or more and 12.5 µm or less or 8.5 µm or more and 11.5 µm or less. The definition of the central portion 11 will be described later. A diameter (outer diameter) of the outer core portion 12 is, for example, equal to the diameter 2a.

The core 10 is made of silica glass. The core 10 contains chlorine, and the chlorine concentration average in the entire core 10 is 10,000 ppm or more and 50,000 ppm or less. Here, the chlorine concentration average in the entire core 10 is the chlorine concentration average in the entire core 10 including the central portion 11 and the outer core portion 12. The chlorine concentration average in the central portion 11 is lower than the chlorine concentration average in the entire core 10. The chlorine concentration average in the entire core 10 minus the chlorine concentration average in the central portion 11 is 4,500 ppm or more and 13,500 ppm or less. This difference may be, for example, 7,200 ppm or more and 13,500 ppm or less.

A diameter (outer diameter) of the cladding 20 is, for example, 124 µm or more and 126 µm or less. The diameter of the cladding 20 is, for example, 125 µm. The diameter of the cladding 20 is, for example, equal to a diameter (outer diameter) of the glass fiber 2. The cladding 20 is made of silica glass. The cladding 20 may contain fluorine, and the concentration of fluorine average in the cladding 20 is, for example, 0 ppm or more and 8,000 ppm or less.

In the region outside the radius of 30 µm in particular, the halogen concentration containing chlorine and fluorine may be 1,000 ppm or less. As a result, the viscosity of the inside region including the core can be relatively lowered and it is possible to prevent an increase in transmission loss attributable to the residual drawing tension in the core and prevent a decrease in light confinement strength.

The coating resin layer 3 has a primary resin layer 31 surrounding the cladding 20 and a secondary resin layer 32 surrounding the primary resin layer 31. A diameter (outer diameter) of the coating resin layer 3 may be 190 µm or more and less than 255 µm or may be 190 µm or more and less than 210 µm. The thickness of the coating resin layer 3 is, for example, 30 µm or more and 68 µm or less. A diameter (outer diameter) of the primary resin layer 31 is, for example, 150 µm or more and 210 µm or less. The thickness of the primary resin layer 31 is, for example, 10 µm or more and 45 µm or less. A diameter (outer diameter) of the secondary resin layer 32 is, for example, equal to the diameter of the coating resin layer 3. The thickness of the secondary resin layer 32 is, for example, 20 µm or more and 35 µm or less.

The primary resin layer 31 and the secondary resin layer 32 are made of cured products of ultraviolet-curable resin compositions. In other words, the coating resin layer 3 contains a cured product of an ultraviolet-curable resin composition. The ultraviolet-curable resin compositions used for the primary resin layer 31 and the secondary resin layer 32 are, for example, urethane acrylate. The primary resin layer 31 and the secondary resin layer 32 are formed by these resin compositions being applied to the glass fiber 2 and then cured by ultraviolet irradiation.

The mode field diameter (hereinafter, "MFD") of the optical fiber 1 at a wavelength of 1,310 nm is 8.6 µm or more and 13.0 µm or less. The MFD may be, for example, 8.6 µm or more and 12.5 µm or less, 8.6 µm or more and 11.0 µm or less, or 8.6 µm or more and 9.5 µm or less.

The effective cross-sectional area (hereinafter, "Aeff") of the optical fiber 1 at a wavelength of 1,550 nm is 70 µm$^2$ or more and 130 µm$^2$ or less. The Aeff may be, for example, 70 µm$^2$ or more and 120 µm$^2$ or less, 70 µm$^2$ or more and 115 µm$^2$ or less, 70 µm$^2$ or more and 110 µm$^2$ or less, or 70 µm$^2$ or more and 100 µm$^2$ or less. The Aeff may be 75 µm$^2$ or more and 105 µm$^2$ or less.

The cable cutoff wavelength (hereinafter, "λcc") of the optical fiber 1 is 1,530 nm or less. In this case, optical communication in a single mode is possible in the C band (1,530 nm or more and 1,565 nm or less). λcc of the optical fiber 1 may be, for example, 1,260 nm or less. In this case, optical communication in a single mode is possible even in the 1.3 µm band.

The transmission loss of the optical fiber 1 at a wavelength of 1,550 nm is 0.15 dB/km or more and 0.18 dB/km or less and may be 0.15 dB/km or more and less than 0.18 dB/km. The transmission loss of the optical fiber 1 at a wavelength of 1,310 nm is 0.24 dB/km or more and 0.40 dB/km or less.

Figure 2:
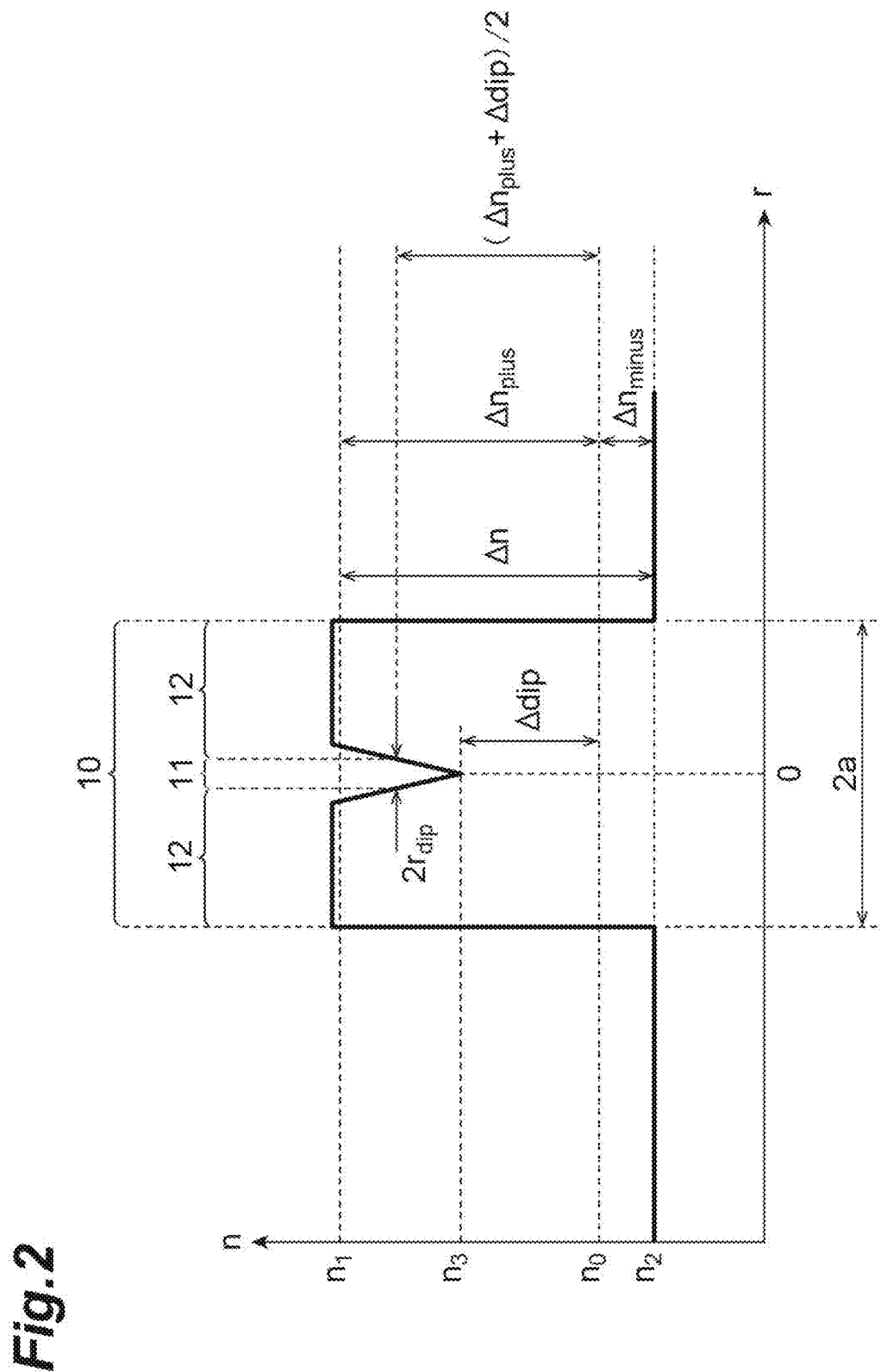
FIG. 2 is a graph schematically showing the refractive index distribution of the optical fiber of FIG. 1.

FIG. 2 is a graph schematically showing the refractive index distribution of the optical fiber of FIG. 1. The horizontal axis represents a radial position r, and the vertical axis represents a refractive index n at a wavelength of 1,550 nm. The radial position of the central axis C (see FIG. 1) is 0 (r=0). Here, the refractive index n has a correlation with the chlorine concentration.

As shown in FIG. 2, an overall average refractive index $n_1$ of the core 10 (see FIG. 1) at a wavelength of 1,550 nm is higher than an overall average refractive index $n_2$ of the cladding 20 (see FIG. 1) at a wavelength of 1,550 nm. A relative refractive index difference Δn of the average refractive index $n_1$ of the core 10 with respect to the average refractive index $n_2$ of the cladding 20 at a wavelength of 1,550 nm is defined as $(n_1-n_2)/n_1$. Δn is 0.25% or more and 0.40% or less. Δn may be 0.25% or more and 0.38% or less or may be 0.28% or more and 0.37% or less.

The part that corresponds to the central portion 11 (see FIG. 1) is a recessed portion where the refractive index decreases as the central axis C (see FIG. 1) is approached.

In the recessed portion, the chlorine concentration also decreases as the central axis C is approached. The part that corresponds to the outer core portion 12 (see FIG. 1) surrounds the recessed portion. The minimum refractive index $n_3$ of the central portion 11 at a wavelength of 1,550 nm is higher than a refractive index $n_0$ of pure silica at a wavelength of 1,550 nm. The average refractive index $n_1$ is higher than the refractive index $n_0$ and the minimum refractive index $n_3$.

A relative refractive index difference $\Delta n_{plus}$ of the average refractive index $n_1$ of the core 10 with respect to the refractive index $n_0$ of pure silica at a wavelength of 1,550 nm is defined as $(n_1-n_0)/n_0$. A relative refractive index difference $\Delta$dip of the minimum refractive index $n_3$ of the central portion 11 with respect to the refractive index $n_0$ of pure silica at a wavelength of 1,550 nm is defined as $(n_3-n_0)/n_0$. The depth of the refractive index of the recessed portion is represented by $\Delta n_{plus}-\Delta$dip.

$\Delta n_{plus}-\Delta$dip is 0.05% or more and 0.15% or less. When the chlorine concentration average in the entire core 10 minus the chlorine concentration average in the central portion 11 is 4,500 ppm or more and 13,500 ppm or less, $\Delta n_{plus}-\Delta$dip is in this range. $\Delta n_{plus}-\Delta$dip may be 0.08% or more and 0.15% or less. When the chlorine concentration average in the entire core 10 minus the chlorine concentration average in the central portion 11 is 7,200 ppm or more and 13,500 ppm or less, $\Delta n_{plus}-\Delta$dip is in this range.

A diameter of the central portion 11 corresponds to an effective diameter (diameter) $2r_{dip}$ of the recessed portion. The effective diameter $2r_{dip}$ of the recessed portion is the diameter of a circle in which the relative refractive index difference of the refractive index of the recessed portion is $(\Delta\text{dip}+\Delta n_{plus})/2$ with respect to the refractive index $n_0$ of pure silica at a wavelength of 1,550 nm. In other words, the central portion 11 is the inside part of a circle in which the chlorine concentration is the median value between the chlorine concentration average in the entire core 10 and the minimum chlorine concentration of the central portion 11 when the optical fiber 1 is viewed in a cross section perpendicular to the central axis C. The diameter of the circle is the diameter of the central portion 11.

The effective diameter $2r_{dip}$ (that is, the diameter of the central portion 11) is 0.5 μm or more and 4 μm or less. The effective diameter $2r_{dip}$ may be 0.8 μm or more and 3 μm or less or 1 μm or more and 2.5 μm or less.

As described above, in the optical fiber 1, the chlorine concentration average in the entire core 10 minus the chlorine concentration average in the central portion 11 of the core 10 is 4,500 ppm or more and 13,500 ppm or less. Accordingly, chlorine bubble generation on the inner surface of the glass pipe can be suppressed during core glass rod formation. Bubbles can be suppressed in the central portion of the glass core rod, and thus bubbles in the central portion of the core portion of the preform can also be suppressed. Accordingly, it is possible to suppress bubbles in the central portion 11 of the optical fiber 1 obtained by the preform being drawn. As a result, a decline in the yield and productivity of the optical fiber 1 can be suppressed.

The depth $\Delta n_{plus}-\Delta$dip of the refractive index of the recessed portion is 0.05% or more and 0.15% or less. Accordingly, the chlorine concentration average in the entire core 10 minus the chlorine concentration average in the central portion 11 is likely to be 4,500 ppm or more and 13,500 ppm or less.

The cladding 20 contains fluorine. In this case, the relative refractive index difference $\Delta n$ of the average refractive index $n_1$ of the core 10 with respect to the average refractive index $n_2$ of the cladding 20 at a wavelength of 1,550 nm can be 0.25% or more even when the chlorine concentration of the entire core 10 is low. Accordingly, the light in the fundamental mode can be trapped.

The MFD at a wavelength of 1,310 nm is 8.6 μm or more and 13.0 μm or less, the Aeff at a wavelength of 1,550 nm is 70 μm² or more and 130 μm² or less, and λcc is 1,530 nm or less. The MFD may be 8.6 μm or more and 11.0 μm or less, the Aeff may be 70 μm² or more and 115 μm² or less, and λcc may be 1,260 nm or less. In the optical fiber 1, the Aeff can be increased, and thus the optical signal-to-noise ratio of the optical communication system can be improved.

The transmission loss of the optical fiber 1 at a wavelength of 1,550 nm is 0.15 dB/km or more and 0.18 dB/km or less, and the transmission loss of the optical fiber 1 at a wavelength of 1,310 nm is 0.24 dB/km or more and 0.40 dB/km or less.

The diameter of the coating resin layer 3 is 190 μm or more and less than 255 μm. The diameter of the coating resin layer 3 may be 190 μm or more and less than 210 μm. The microbending loss increases as the diameter of the coating resin layer 3 decreases (the coating resin layer 3 becomes thin). In the optical fiber 1, the microbending loss can be suppressed when the diameter of the coating resin layer 3 is in this range.

EXAMPLES

Hereinafter, the present disclosure will be described in more detail with the results of evaluation tests using examples and comparative examples according to the present disclosure. It should be noted that the present disclosure is not limited to these examples.

Table 1 shows the results of measuring the optical characteristics of the optical fibers according to the comparative examples and examples. In Comparative Examples 1 and 2, the chlorine concentration on the inner surface of the glass pipe body was not reduced. In Examples 1 to 5, the chlorine concentration on the inner surface of the glass pipe body was reduced. In Table 1, the preform bubble count indicates the number of bubbles formed at the center of the preform (part where the center of the glass core rod is solidified) in the longitudinal region of the preform corresponding to 1,000 km of the optical fiber in which the outer diameter of the glass fiber is 125 μm. In addition, the bending loss indicates the loss of the optical fiber at a wavelength of 1,550 nm when the optical fiber is deployed 10 times on a mandrel with a diameter of 30 mm

TABLE 1

| Item | Comparative Example 1 | Comparative Example 2 | Example 1 | Example 2 | Example 3 | Example 4 | Example 5 |
|---|---|---|---|---|---|---|---|
| $\Delta n$ | 0.34 | 0.33 | 0.34 | 0.35 | 0.35 | 0.34 | 0.35 |
| 2a | 9.4 | 9.3 | 9.5 | 9.9 | 9.6 | 9.7 | 10.3 |
| $\Delta n_{plus}$ | 0.34 | 0.24 | 0.24 | 0.2 | 0.35 | 0.35 | 0.23 |
| $\Delta n_{minus}$ | 0 | −0.07 | −0.1 | −0.15 | 0 | 0 | −0.12 |

TABLE 1-continued

| Item | Comparative Example 1 | Comparative Example 2 | Example 1 | Example 2 | Example 3 | Example 4 | Example 5 |
|---|---|---|---|---|---|---|---|
| $\Delta$dip | 0.31 | 0.22 | 0.16 | 0.14 | 0.24 | 0.24 | 0.16 |
| $\Delta n_{plus}$ - $\Delta$dip | 0.03 | 0.02 | 0.08 | 0.06 | 0.11 | 0.11 | 0.07 |
| $2r_{dip}$ | 2.2 | 1.9 | 1.3 | 1.4 | 1.4 | 1.4 | 1.5 |
| Chlorine concentration of core [ppm] | $2.9 \times 10^4$ | $2.2 \times 10^4$ | $1.9 \times 10^4$ | $1.5 \times 10^4$ | $2.7 \times 10^4$ | $3.2 \times 10^4$ | $2.1 \times 10^4$ |
| Preform bubble count (per 1,000 km of optical fiber 125 μm in glass outer diameter) | 10 | 5 | 1 | 0 | 1 | 1 | 0 |
| MFD (1,310 nm) [μm] | 8.98 | 9.02 | 9.08 | 9.02 | 9 | 9.11 | 9.07 |
| Aeff (1,550 nm) [μm$^2$] | 79.5 | 80 | 82.5 | 81.6 | 82 | 84.1 | 83.19 |
| λcc [μm] | 1,127 | 1,103 | 1,102 | 1,107 | 1,124 | 1,120 | 1,152 |
| Transmission loss (1,550 nm) [dB/km] | 0.19 | 0.18 | 0.16 | 0.16 | 0.16 | 0.16 | 0.16 |
| Bending loss (1,550 nm, 10 turns around mandrel 30 mm in diameter) [dB] | 0.08 | 0.21 | 0.21 | 0.17 | 0.12 | 0.25 | 0.05 |

As shown in Table 1, in the comparative examples, the preform bubble count is 5 or more and the transmission loss is 0.18 dB/km. On the other hand, in the examples, the preform bubble count is suppressed to 1 or less and the transmission loss is suppressed to less than 0.18 dB/km. In the comparative examples, it is conceivable that a large amount of fine chlorine bubbles that cannot be visually confirmed remain at the center of the preform and this becomes a scatterer and exacerbates the transmission loss. On the other hand, in the examples, it is conceivable that the generation of fine chlorine bubbles is suppressed by a decrease in the chlorine concentration on the inner surface of the glass pipe body and the exacerbation of the transmission loss is suppressed as a result.

Figure 3:
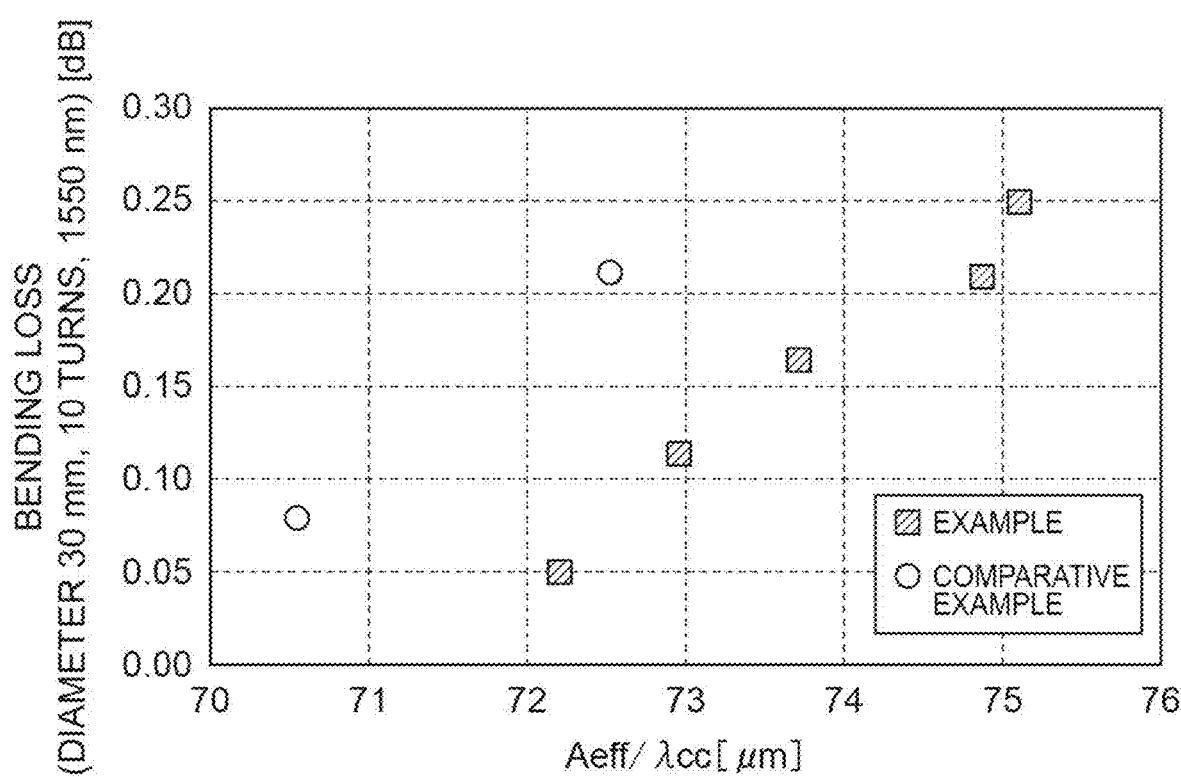
FIG. 3 is a graph showing the relationship between the ratio of an effective cross-sectional area to a cable cutoff wavelength and bending loss.

FIG. 3 is a graph showing the relationship between the bending loss and Aeff/λcc, which is the ratio of the Aeff to λcc. As shown in FIG. 3, the Aeff/λcc-bending loss relationships of the examples and comparative examples are different. In other words, the bending loss of the example is lower than the bending loss of the comparative example at the same Aeff/λcc. It is conceivable that this is the effect of having formed the recessed portion in the refractive index of the optical fiber finally obtained by spinning of the optical fiber preform by reducing the chlorine concentration on the inner surface of the glass pipe body and the chlorine concentration in the central portion of the glass core rod.

The bending loss of the example being lower than the bending loss of the comparative example at the same Aeff/λcc means that the Aeff at the same bending loss and λcc can be larger in the example than in the comparative example. In other words, in the optical communication system using the optical fiber of the example, the optical signal-to-noise ratio can be improved as compared with the optical communication system using the optical fiber of the comparative example.

In addition, since the bending loss of the example is lower than the bending loss of the comparative example at the same Aeff/λcc, it is possible to suppress the microbending loss that may increase when the diameter of the coating resin layer is small (the coating resin layer is thin).

What is claimed is:
1. An optical fiber comprising:
 a core containing silica glass and including a central portion, the central portion including a central axis of the optical fiber and having a diameter of 0.5 μm or more and 4 μm or less; and
 a cladding containing silica glass and surrounding the core, wherein
 the core contains chlorine,
 a chlorine concentration averaged in the core is 10,000 ppm or more and 50,000 ppm or less, and
 the chlorine concentration averaged in the core minus a chlorine concentration averaged in the central portion is 4,500 ppm or more and 13,500 ppm or less.
2. The optical fiber according to claim 1, wherein
 an average relative refractive index difference of the core with respect to an average refractive index of the cladding at a wavelength of 1,550 nm is 0.25% or more and 0.40% or less, and
 a diameter of the core is 8.5 μm or more and 13.5 μm or less.
3. The optical fiber according to claim 2, wherein $\Delta n_{plus}\Delta$dip is 0.05% or more and 0.15% or less, the $\Delta n_{plus}$ being the average relative refractive index difference of the core with respect to a refractive index of pure silica at a wavelength of 1,550 nm and the $\Delta$dip being a minimum relative refractive index difference of the central portion with respect to the refractive index of pure silica at a wavelength of 1,550 nm.
4. The optical fiber according to claim 1, wherein the cladding contains fluorine.
5. The optical fiber according to claim 1, wherein
 a mode field diameter of the optical fiber at a wavelength of 1,310 nm is 8.6 μm or more and 13.0 μm or less,
 an effective cross-sectional area of the optical fiber at a wavelength of 1,550 nm is 70 μm$^2$ or more and 130 μm$^2$ or less, and
 a cable cutoff wavelength of the optical fiber is 1,530 nm or less.
6. The optical fiber according to claim 1, wherein
 a mode field diameter of the optical fiber at a wavelength of 1,310 nm is 8.6 μm or more and 11.0 μm or less,
 an effective cross-sectional area of the optical fiber at a wavelength of 1,550 nm is 70 μm$^2$ or more and 115 μm$^2$ or less, and
 a cable cutoff wavelength of the optical fiber is 1,260 nm or less.
7. The optical fiber according to claim 1, wherein
 a transmission loss of the optical fiber at a wavelength of 1,550 nm is 0.15 dB/km or more and 0.18 dB/km or less, and
 the transmission loss of the optical fiber at a wavelength of 1,310 nm is 0.24 dB/km or more and 0.40 dB/km or less.
8. The optical fiber according to claim 1, further comprising a coating resin layer surrounding the cladding and containing an acrylate-based resin,
 wherein a diameter of the coating resin layer is 190 μm or more and less than 255 μm.

9. The optical fiber according to claim 1, further comprising a coating resin layer surrounding the cladding and containing an acrylate-based resin,
   wherein a diameter of the coating resin layer is 190 μm or more and less than 210 μm.

10. An optical fiber comprising:
   a core including a central portion, the central portion including a central axis of the optical fiber and having a diameter of 0.5 μm or more and 4 μm or less; and
   a cladding surrounding the core, wherein
   the core contains chlorine,
   a chlorine concentration averaged in the core is 10,000 ppm or more and 50,000 ppm or less,
   an average relative refractive index difference of the core with respect to an average refractive index of the cladding at a wavelength of 1,550 nm is 0.25% or more and 0.40% or less,
   a diameter of the core is 8.5 μm or more and 13.5 μm or less, and
   $\Delta n_{plus} - \Delta dip$ is 0.05% or more and 0.15% or less, the $\Delta n_{plus}$ being the average relative refractive index difference of the core with respect to a refractive index of pure silica at a wavelength of 1,550 nm and the $\Delta dip$ being a minimum relative refractive index difference of the central portion with respect to the refractive index of pure silica at a wavelength of 1,550 nm.

11. The optical fiber according to claim 10, wherein the cladding contains fluorine.

12. The optical fiber according to claim 10, wherein
   a mode field diameter of the optical fiber at a wavelength of 1,310 nm is 8.6 μm or more and 13.0 μm or less,
   an effective cross-sectional area of the optical fiber at a wavelength of 1,550 nm is 70 μm$^2$ or more and 130 μm$^2$ or less, and
   a cable cutoff wavelength of the optical fiber is 1,530 nm or less.

13. The optical fiber according to claim 10, wherein
   a mode field diameter of the optical fiber at a wavelength of 1,310 nm is 8.6 μm or more and 11.0 μm or less,
   an effective cross-sectional area of the optical fiber at a wavelength of 1,550 nm is 70 μm$^2$ or more and 115 μm$^2$ or less, and
   a cable cutoff wavelength of the optical fiber is 1,260 nm or less.

14. The optical fiber according to claim 10, wherein
   a transmission loss of the optical fiber at a wavelength of 1,550 nm is 0.15 dB/km or more and 0.18 dB/km or less, and
   the transmission loss of the optical fiber at a wavelength of 1,310 nm is 0.24 dB/km or more and 0.40 dB/km or less.

15. The optical fiber according to claim 10, further comprising a coating resin layer surrounding the cladding and containing an acrylate-based resin,
   wherein a diameter of the coating resin layer is 190 μm or more and less than 255 μm.

16. The optical fiber according to claim 10, further comprising a coating resin layer surrounding the cladding and containing an acrylate-based resin,
   wherein a diameter of the coating resin layer is 190 μm or more and less than 210 μm.

* * * * *